(12) United States Patent
Yamazaki et al.

(10) Patent No.: US 9,973,701 B2
(45) Date of Patent: May 15, 2018

(54) MONITORING SYSTEM

(71) Applicant: Keyence Corporation, Osaka (JP)

(72) Inventors: Kentaro Yamazaki, Osaka (JP); Tsuyoshi Tagashira, Osaka (JP)

(73) Assignee: Keyence Corporation, Osaka (JP)

( * ) Notice: Subject to any disclaimer, the term of this patent is extended or adjusted under 35 U.S.C. 154(b) by 274 days.

(21) Appl. No.: 14/942,019

(22) Filed: Nov. 16, 2015

(65) Prior Publication Data
US 2016/0163171 A1 Jun. 9, 2016

(30) Foreign Application Priority Data
Dec. 9, 2014 (JP) .................. 2014-249003

(51) Int. Cl.
| | | |
|---|---|---|
| *G08B 13/194* | (2006.01) | |
| *G08B 13/196* | (2006.01) | |
| *G08B 13/18* | (2006.01) | |
| *H04N 5/232* | (2006.01) | |
| *G01V 8/10* | (2006.01) | |
| *H04N 7/18* | (2006.01) | |
| *B25J 19/06* | (2006.01) | |
| *G01B 11/00* | (2006.01) | |

(52) U.S. Cl.
CPC .......... *H04N 5/23293* (2013.01); *B25J 19/06* (2013.01); *G01V 8/10* (2013.01); *G08B 13/18* (2013.01); *G08B 13/194* (2013.01); *G08B 13/196* (2013.01); *H04N 7/183* (2013.01); *G01B 11/00* (2013.01)

(58) Field of Classification Search
CPC ... G01B 11/00–11/306; G08B 13/18–13/1895; G08B 13/19–13/19697
See application file for complete search history.

(56) References Cited

U.S. PATENT DOCUMENTS

| | | | |
|---|---|---|---|
| 6,894,623 B2 | 5/2005 | Hama et al. | |
| 7,485,841 B2 | 2/2009 | Inoue et al. | |
| 7,598,484 B2 | 10/2009 | Yamaguchi | |
| 7,821,394 B2 | 10/2010 | Fukumura | |
| 8,063,780 B2 | 11/2011 | Onishi | |
| 8,069,007 B2 | 11/2011 | Oh | |

(Continued)

FOREIGN PATENT DOCUMENTS

| | | |
|---|---|---|
| JP | 2009-294734 | 12/2009 |
| JP | 2009-296087 | 12/2009 |

*Primary Examiner* — William C Vaughn, Jr.
*Assistant Examiner* — Lindsay Uhl
(74) *Attorney, Agent, or Firm* — Kilyk & Bowersox, P.L.L.C.

(57) ABSTRACT

There is provided a monitoring system capable of facilitating checking of an installation status of a sensor body, and also capable of reducing personal identification of a worker even in the case of displaying a camera image with the worker appearing therein. The monitoring system is configured of: an intrusion detecting section for detecting an intruding object in a monitoring area, to generate a stop signal for stopping an operation of an external device; a camera for photographing the monitoring area; a detail check image generating section for generating a detail check image for display based on a camera image photographed by the camera; a privacy image generating section for generating a privacy image with lower picture quality than picture quality of the detail check image based on the camera image.

19 Claims, 7 Drawing Sheets

(56) References Cited

U.S. PATENT DOCUMENTS

| | | | |
|---|---|---|---|
| 8,248,235 B2 | 8/2012 | Inoue et al. | |
| 8,319,171 B2 | 11/2012 | Kawabata | |
| 8,330,095 B2 | 12/2012 | Kawabata | |
| 8,415,609 B2 | 4/2013 | Kawabata et al. | |
| 8,487,236 B2 | 7/2013 | Tagashira | |
| 8,648,292 B2 | 2/2014 | Kawabata et al. | |
| 2003/0029992 A1 | 2/2003 | Kudo et al. | |
| 2004/0145657 A1* | 7/2004 | Yamamoto | H04N 7/181 348/143 |
| 2009/0283666 A1 | 11/2009 | Tagashira | |
| 2009/0295577 A1* | 12/2009 | Yamaguchi | G01S 17/026 340/541 |
| 2010/0149330 A1* | 6/2010 | Salgar | G08B 13/19686 348/143 |
| 2016/0155306 A1 | 6/2016 | Kawanaka et al. | |

\* cited by examiner

MONITORING SYSTEM

CROSS-REFERENCE TO RELATED APPLICATIONS

The present application claims foreign priority based on Japanese Patent Application No. 2014-249003, filed Dec. 9, 2014, the contents of which is incorporated herein by reference.

BACKGROUND OF THE INVENTION

1. Field of the Invention

The present invention relates to a monitoring system, and more specifically relates to a monitoring system that detects an intruding object in a monitoring area, to generate a stop signal for stopping an operation of an external device.

2. Description of Related Art

An area monitoring sensor is a safety device which optically detects an intruding object, such as a person, that has intruded into a monitoring area, to generate a stop signal for stopping an operation of an external device such as a machine tool (e.g., Unexamined Japanese Patent Publication Nos. 2009-296087 and 2009-294734).

For example, the area monitoring sensor is provided with a light projection part that generates detection light, a scanning part that performs a scan with the detection light in a circumferential direction about a rotational axis, and a light reception part that receives the detection light reflected by a target to generate a detection signal. The intruding object is detected by obtaining a distance to the target based on the detection signal and specifying a two-dimensional position of the target from the distance to the target and a scanning angle of the detection light.

Area setting information to specify the monitoring area and operation setting information to specify an operating condition for area monitoring are created by use of a terminal device such as a personal computer. The terminal device generates setting data made up of the area setting information and the operation setting information based on a user operation, and transmits the setting data to the area monitoring sensor. The area monitoring sensor detects intrusion based on the setting data received from the terminal device.

In such a monitoring system as described above, it is considered that a camera for photographing the monitoring area is provided in a sensor body that detects the intruding object in the monitoring area to generate the stop signal, and the camera is used to check whether or not the sensor body is appropriately installed with respect to the monitoring area. However, this kind of safety device is often installed in a building, such as a factory, with a large number of workers. Hence a worker is apt to get into an angle of view of the camera to appear as a subject in a photographed image, which is problematic. When such a photographed image is displayed, the worker is at the risk of being personally identified.

SUMMARY OF THE INVENTION

The present invention was made in view of the above circumstances. It is an object of the present invention to provide a monitoring system capable of facilitating checking of an installation status of a sensor body, and also capable of reducing personal identification of a worker even in the case of displaying a camera image with the worker appearing therein.

Further, it is an object of the present invention to provide a monitoring system capable of facilitating checking of the installation status while reducing personal identification of the worker.

According to one embodiment, a monitoring system of the invention is provided with: an intrusion detecting section for detecting an intruding object in a monitoring area, to generate a stop signal for stopping an operation of an external device; a camera for photographing the monitoring area; a detail check image generating section for generating a detail check image for display based on a camera image photographed by the camera; a privacy image generating section for generating a privacy image with lower picture quality than picture quality of the detail check image based on the camera image; a display image selecting section for selecting either the detail check image or the privacy image as a display image; and an image displaying section for displaying the display image selected by the display image selecting section.

With such a configuration, selecting the detail check image as the display image can facilitate checking of an installation status as to whether or not a sensor body has been appropriately installed with respect to a monitoring area. Further, selecting as the display image the privacy image with lower picture quality than that of the detail check image enables reduction in personal identification of a worker even when the worker appears in the camera image as a subject.

In addition to the above configuration, a monitoring system according to another embodiment of the invention is provided with: a light projecting section for generating detection light; a light receiving section for receiving the detection light reflected by a target, to generate a detection signal; a scanning section for performing a scan with the detection light in a circumferential direction about a rotational axis, along a scanning surface intersecting with the rotational axis; and a distance measuring section for obtaining a distance to the target based on the detection signal. In this system, the intrusion detecting section detects an intruding object in the monitoring area based on the distance to the target and a scanning angle of the detection light, the camera is arranged above the scanning surface in terms of the rotational axial direction, and the privacy image generating section specifies a boundary line made up of a position of the target on the scanning surface based on the distance to the target and the scanning angle of the detection light, and takes a band-like region including the boundary line in the privacy image as a focused monitoring region, to match picture quality of the focused monitoring region with picture quality of the detail check image.

With such a configuration, a parallax in the rotational axial direction occurs between the scanning surface of detection light and a photographing direction of the camera, and hence it is possible to obtain a camera image of the scanning surface viewed from above. This can facilitate obtainment of a sense of perspective on the boundary line on the scanning surface when the detail check image or the privacy image is displayed. Further, the band-like focused monitoring region including the boundary line on the scanning surface is formed in the privacy image, and the picture quality of the focused monitoring region is matched with that of the detail check image. Hence it is possible to facilitate checking of the installation status while reducing personal identification of the worker.

In addition to the above configurations, a monitoring system according to still another embodiment of the invention is provided with a detection history storing section for storing as a detection history the camera image photographed at the time of detection of the intruding object in the monitoring area, along with positional information indicating a position of the intruding object. In this system, the privacy image generating section generates the privacy image based on the camera image stored as the detection history, and the image displaying section displays the position of the intruding object on the privacy image based on the positional information stored as the detection history.

With such a configuration, the position of the intruding object is displayed in the privacy image obtained from the camera image stored as the detection history, and hence it is possible to facilitate checking of the intruding object having intruded into the monitoring area. It is thereby possible to find in detail what has caused generation of the stop signal. Further, since such a privacy image has lower picture quality than that of the detail check image, it is possible to reduce personal identification of the worker due to display of the privacy image.

In addition to the above configurations, in a monitoring system according to still another embodiment of the invention, the image displaying section is provided separately from a sensor body that includes the intrusion detecting section, the camera and the detection history storing section, and is made up of a display device used in common among two or more of the sensor bodies. With such a configuration, it is possible to reduce an increase in storage capacity on the image displaying section side as compared to the case of holding a detection history made up of camera images photographed by a plurality of sensor bodies altogether along with the image displaying section.

In addition to the above configurations, in a monitoring system according to still another embodiment of the invention, the privacy image generating section generates two or more of the privacy images each having different picture quality based on a common camera image, and the display image selecting section selects any one of the privacy images as the display image based on a user operation. With such a configuration, it is possible to switch the picture quality of the privacy image as necessary.

In addition to the above configurations, a monitoring system according to still another embodiment of the invention is provided with: a user operation inputting section for accepting identification information specified by the user; and a user identifying section for collating the identification information with registration information previously specified by an administrator. In this system, when succeeding in the user identification, the display image selecting section selects either the detail check image or the privacy image as the display image based on a user operation, and when failing in the user identification, the display image selecting section selects the privacy image as the display image.

With such a configuration, viewing of the detail check image is limited to the user who has succeeded in the user identification, thus allowing reduction in seeing of a behavior of the worker by many users due to display of the detail check image.

In the monitoring system according to the present invention, it is possible to facilitate checking of the installation status of the sensor body, and also possible to reduce personal identification of the worker even in the case of displaying a camera image with the worker appearing therein. Further, the band-like focused monitoring region including the boundary line on the scanning surface is formed in the privacy image, and picture quality of the focused monitoring region is matched with that of the detail check image. Hence it is possible to facilitate checking of the installation status while reducing personal identification of the worker.

DETAILED DESCRIPTION OF PREFERRED EMBODIMENT

First, a schematic configuration of a monitoring system presumed in the present invention will be described below with reference to FIGS. 1 to 4.

<Monitoring System 1>

Figure 1:
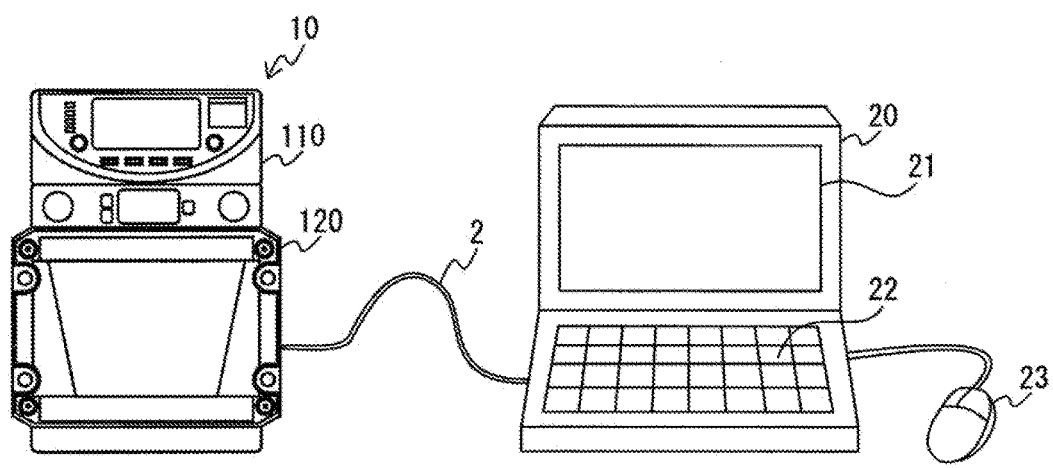
FIG. 1 is a system view showing one configuration example of a monitoring system according to an embodiment of the present invention.

FIG. 1 is a system view showing one configuration example of a monitoring system 1 according to an embodiment of the present invention. This monitoring system 1 is configured of; an area monitoring sensor 10 that optically detects an intruding object in a monitoring area, to generate a stop signal for stopping an operation of an external device; and a PC (Personal Computer) 20 for setting the monitoring area, a scanning condition, and the like.

The area monitoring sensor 10 is an optical scanning-type safety sensor, and configured of an interface part 110 and a sensor body 120. The interface part 110 is an input-output unit that accepts a user operation and displays an operating state, and the like. The sensor body 120 is a measurement unit that projects detection light, and receives the detection light reflected by a target, to obtain a distance to the target.

The PC 20 is a terminal device provided with a screen display part 21, a key board 22 and a mouse 23, and the PC 20 has an application program installed therein for setting the monitoring area in the area monitoring sensor 10. The area monitoring sensor 10 and the PC 20 are connected through a communication cable 2.

<Production System>

Figure 2:
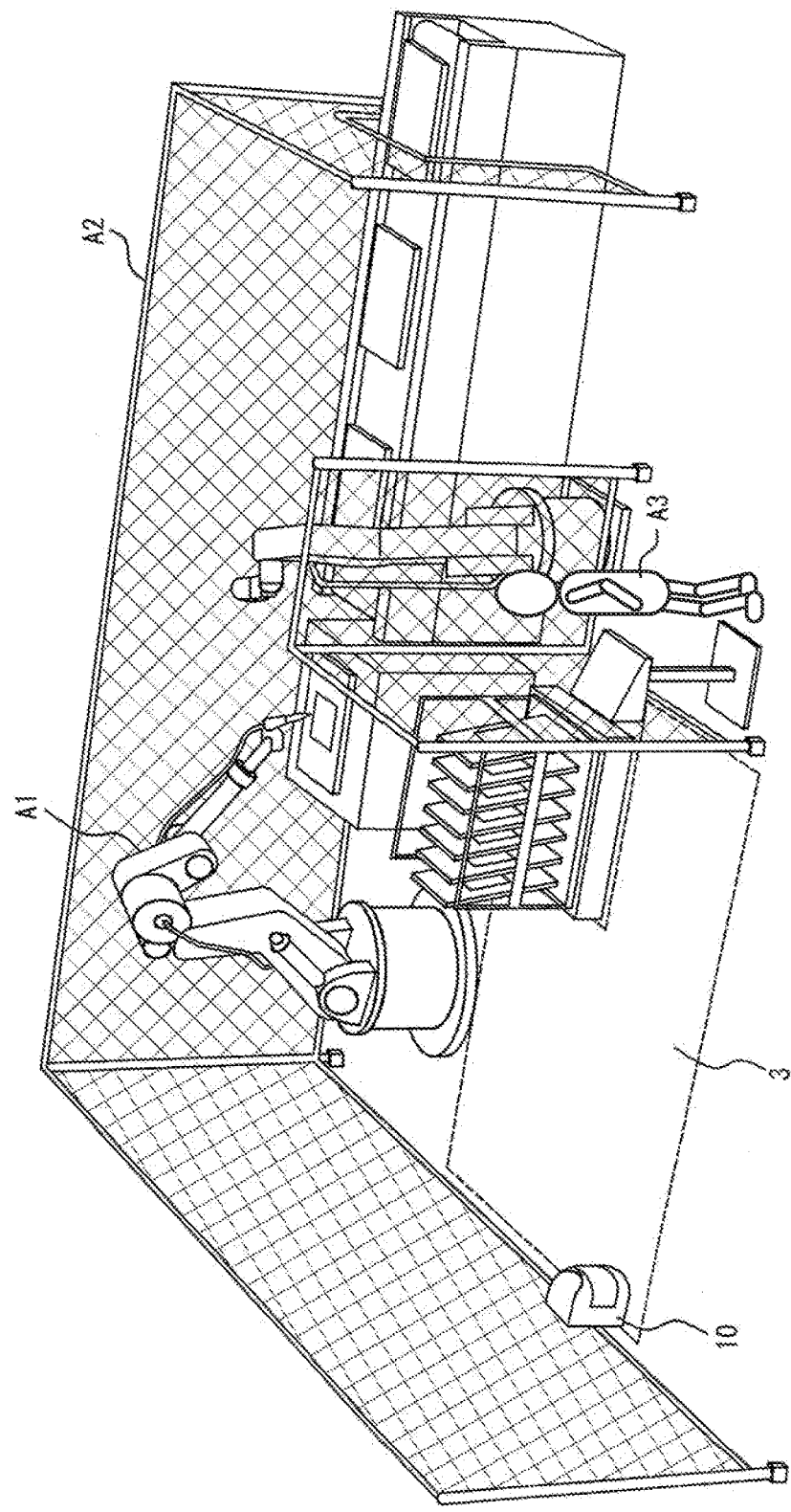
FIG. 2 is a perspective view showing one configuration example of a production system installed with an area monitoring sensor of FIG. 1.

FIG. 2 is a perspective view showing one configuration example of a production system installed with the area monitoring sensor 10 of FIG. 1. In this production system, a carrier and a work robot A1 are arranged in a region partitioned by a protective fence A2. An area around mechanical equipment, such as an operating area of the work robot A1, is set as a monitoring area 3, and an intruding object in the monitoring area 3 is detected by the area monitoring sensor 10.

The area monitoring sensor 10 monitors the monitoring area 3 by scanning it with detection light and detects an intruding object, such as an operator A3 who operates a control board of the mechanical equipment, to generate a stop signal for stopping an operation of the external device. The monitoring area 3 is formed of a region within an installation surface on which the area monitoring sensor 10 is installed, such as a region within a horizontal floor surface. The intruding object is detected by receiving detection light reflected by the target to obtain a distance to the target, and specifying a two-dimensional position of the target from the distance to the target and a scanning angle of the detection light.

The stop signal is used as a control signal for stopping the work robot A1 that works around the monitoring area 3. For example, the area monitoring sensor 10 has an OSSD (Output Signal Switching Device). With the intruding object being not present in the monitoring area 3, the OSSD enters an on-state and an operation permission signal is outputted. On the other hand, with the intruding object being present in the monitoring area 3, the OSSD enters an off-state, and an operation non-permission signal is outputted as the stop signal.

<Area Monitoring Sensor 10>

Figure 3A:
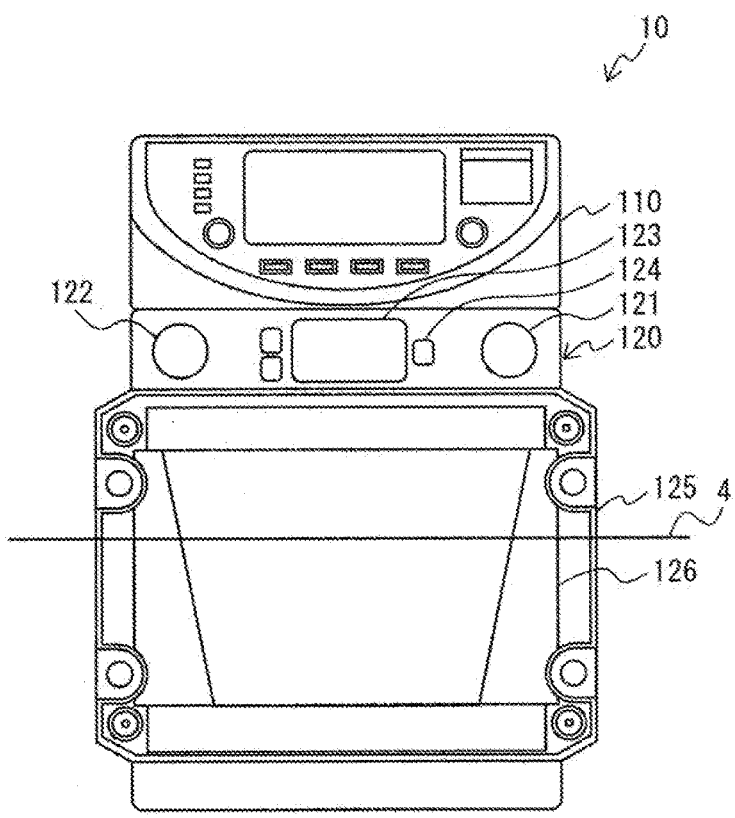
FIGS. 3A and 3B are views showing a configuration example of the area monitoring sensor of FIG. 1.
Figure 3B:
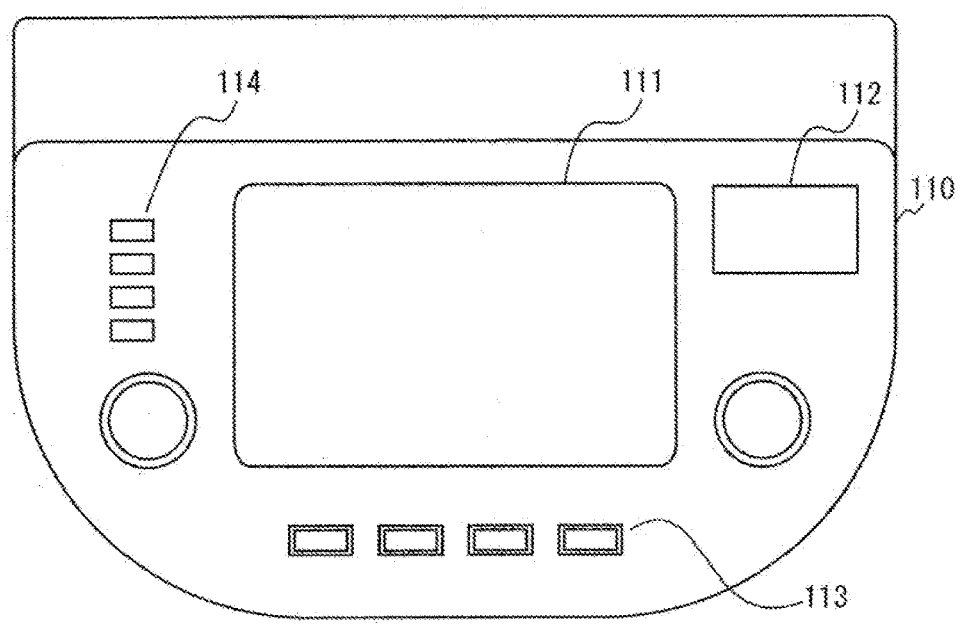

FIGS. 3A and 3B are views showing a configuration example of the area monitoring sensor 10 of FIG. 1, and show a separation-type safety sensor capable of separating the interface part 110 from the sensor body 120. FIG. 3A shows a case where the area monitoring sensor 10 is viewed from front, and FIG. 3B shows the interface part 110.

This area monitoring sensor 10 is configured of the interface part 110 that displays a variety of information and accepts a user operation, and the sensor body 120 that generates detection light and performs a scan with the detection light along a horizontal scanning surface 4. The interface part 110 is arranged on the top surface of the sensor body 120.

As the detection light, for example, laser light with a wavelength in the infrared region is used. The detection light is repeatedly scanned in a certain period. The sensor body 120 is arranged with cameras 121 and 122 for photographing the monitoring area 3, and with indicators 123 and 124 for indicating the operating state. Further, a scanner part 125 of the sensor body 120 has a protection cover 126 for protecting a scanning mirror. The detection light is scanned in a circumferential direction about a rotational axis of the mirror. The scanning surface 4 is orthogonal to the rotational axis.

The cameras 121 and 122 and the indicators 123 and 124 are arranged above the scanner part 125. That is, the cameras 121 and 122 are arranged above the scanning surface 4 in terms of the rotational axial direction. With such a configuration, a parallax in the rotational axial direction occurs between the scanning surface 4 and photographing directions of the cameras 121 and 122, and hence it is possible to obtain a camera image of the scanning surface 4 viewed from above.

The cameras 121 and 122 are imaging devices both arranged toward a horizontal direction, and oriented in mutually different directions. The cameras 121 and 122 are arranged respectively on the right side and the left side of the sensor body 120 with the indicators 123 and 124 placed therebetween within the horizontal surface. Herein, the camera 121 is referred to as a left-side camera, and the camera 122 is referred to as a right-side camera. The indicator 123 is an indicating lamp that indicates detection or non-detection of the intruding object. For example, the indicator 123 indicates an output state of the OSSD, and the like. The indicator 124 is an indicating lamp that indicates an error state.

The interface part 110 is arranged with an image display part 111, a cable connecting port 112, a user operation input part 113, and an indicator part 114. The image display part 111 is a display device that displays on a screen a result of detection of the intruding object, a monitoring status, a camera image photographed by the camera 121 or 122, input information, and the like. For example, an LCD (Liquid Crystal Display) is used for the image display part 111.

The cable connecting port 112 is an input-output terminal part for making connection to the PC 20 or the external device so as to perform communication. The communication cable is detachably connected to the cable connecting port 112. The user operation input part 113 is made up of two or more user operation buttons used for inputting a numeral value at the time of setting the monitoring area 3, selecting a menu item, switching an operation mode, switching a camera image, and the like. The indicator part 114 is made up of two or more indicating lamps for indicating the operating state, and indicates an output state of the OSSD, and the like.

The interface part 110 communicates with the sensor body 120, and even when located separately from the sensor body 120, the interface part 110 can set the monitoring area 3, or check a result of detection of the intruding object and a monitoring status. Further, the interface part 110 can be connected with two or more sensor bodies 120, to set the monitoring area 3 in each of these sensor bodies 120 or acquire a camera image from each of these sensor bodies 120 to display the image. That is, the interface part 110 is a display device used in common among the two or more sensor bodies 120.

Figure 4:
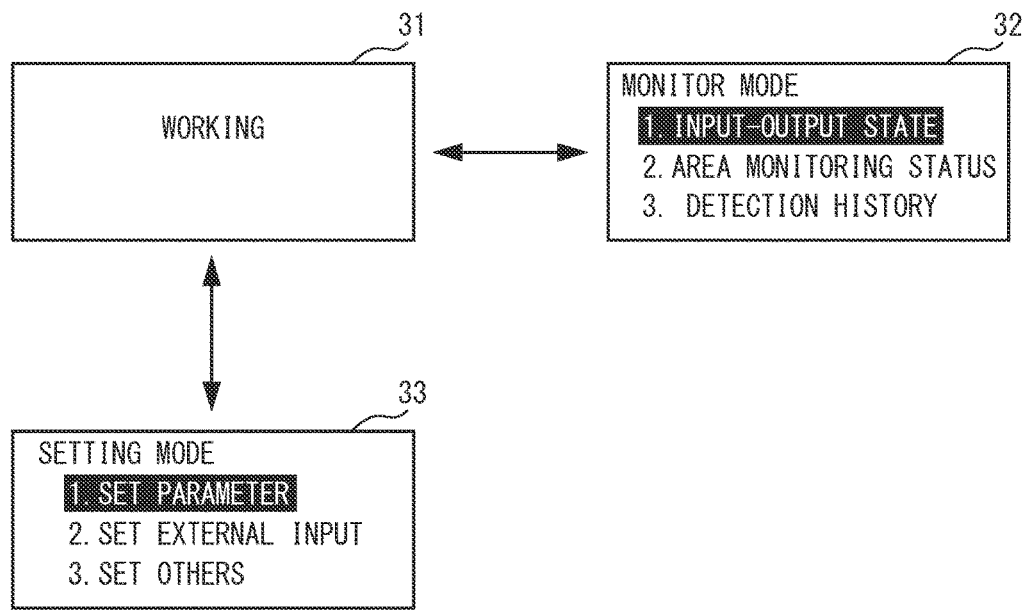
FIG. 4 is a view showing one example of an operation of the area monitoring sensor of FIGS. 3A and 3B, and shows a working screen, a monitor screen and a setting screen that are displayed in an image display part.

FIG. 4 is a view showing one example of the operation of the area monitoring sensor 10 of FIGS. 3A and 3B, and shows a run indicating screen 31, a monitor screen 32 and a setting screen 33 that are displayed in the image display part 111. This area monitoring sensor 10 switches the operation mode among a run mode, a monitor mode and a setting mode based on a user operation.

The run mode is an operation mode for detecting the intruding object in the monitoring area 3 to output the stop signal, and the run indicating screen 31 is displayed in the image display part 111. This run indicating screen 31 displays a message indicating that the sensor is working.

The monitor mode is an operation mode for displaying an input-output state, an area monitoring status and a detection history, and the monitor screen 32 is displayed in the image display part 111. This monitor screen 32 displays menu items for selection of any of the input-output state, the area monitoring status and the detection history.

Selecting the menu item "1. INPUT-OUTPUT STATE" allows monitoring of an output state of the OSSD, an input state of EDM (External Device Monitoring), and the like. Selecting the menu item "2. AREA MONITORING STATUS" allows monitoring of a shape and a size of the monitoring area, a distance to the target, a scanning range of the detection light, and the like. Selecting the menu item "3. DETECTION HISTORY" allows display of a camera image, a position of the intruding object, a detection time, and the like, which are acquired when the OSSD shifts to the off-state, as the detection history.

The setting mode is an operation mode for setting a parameter for specifying the monitoring area 3 and setting an external input, and the setting screen 33 is displayed in the image display part 111. This setting screen 33 displays menu items for selection of any of parameter setting, external input setting and other setting.

Selecting the menu item "1. SET PARAMETER" allows display of an input screen for specifying the monitoring area 3. Selecting the menu item "2. SET EXTERNAL INPUT" allows display of an input screen for EDM. Selecting the menu item "3. SET OTHERS" allows setting of a resolving power and response time.

Next, a configuration of a characteristic portion of the monitoring system according to the present invention will be described below with reference to FIGS. 5 to 9.

<Monitoring Area 3>

Figure 5:
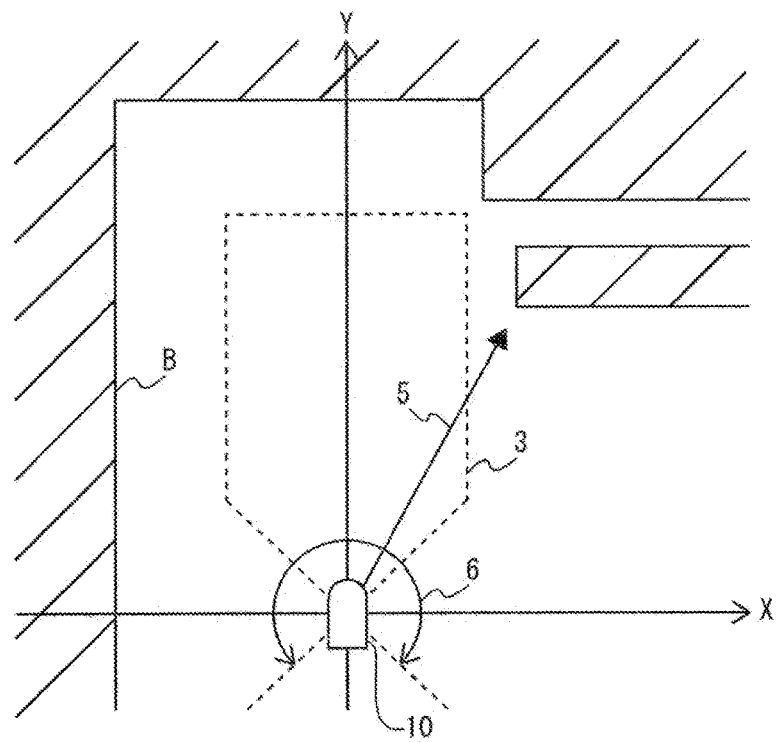
FIG. 5 is an explanatory view schematically showing one example of the operation of the area monitoring sensor of FIGS. 3A and 3B and shows the positional relation among a photographing direction, a scanning range and a target.

FIG. 5 is an explanatory view schematically showing one example of the operation of the area monitoring sensor 10 of FIGS. 3A and 3B, and shows the positional relation among the photographing direction 5 of the camera 122, the scanning range 6 of the detection light and the target B. The area monitoring sensor 10 is installed on the horizontal floor surface or the like. The monitoring area 3 is specified by setting a coordinate axis on the horizontal surface.

For example, orthogonal coordinates are set with the area monitoring sensor 10 as a center, a longitudinal direction of the area monitoring sensor 10 as a Y-axis, and a lateral direction orthogonal to the Y-axis as an X-axis. The monitoring area 3 is specified using coordinate components for each coordinate axis. In this example, a pentagonal region with the area monitoring sensor 10 as one of its apexes is specified as the monitoring area 3.

The detection light is emitted outward in terms of a radical direction with the area monitoring sensor 10 as a center, and scanned in the circumferential direction along the horizontal surface. The area monitoring sensor 10 can monitor a scanning range 6 at an angle over 180°.

The target B is the mechanical equipment or a wall of a building. By receiving the detection light reflected by the target B, a distance from the area monitoring sensor 10 to the target B is obtained. For example, the distance to the target B is obtained by measuring TOF (Time Of Flight) of the detection light.

The photographing direction 5 of the camera 122 is taken in a region on the right side to the Y-axis, viewed from above the area monitoring sensor 10. Displaying a camera image photographed by the camera 122 in the image display part 111 enables checking of the positional relation between the monitoring area 3 and the target B. It is to be noted that the photographing direction 5 of the camera 121 is taken in a region on the left side to the Y-axis, viewed from above the area monitoring sensor 10.

<Detail Check Image 41>

Figure 6:
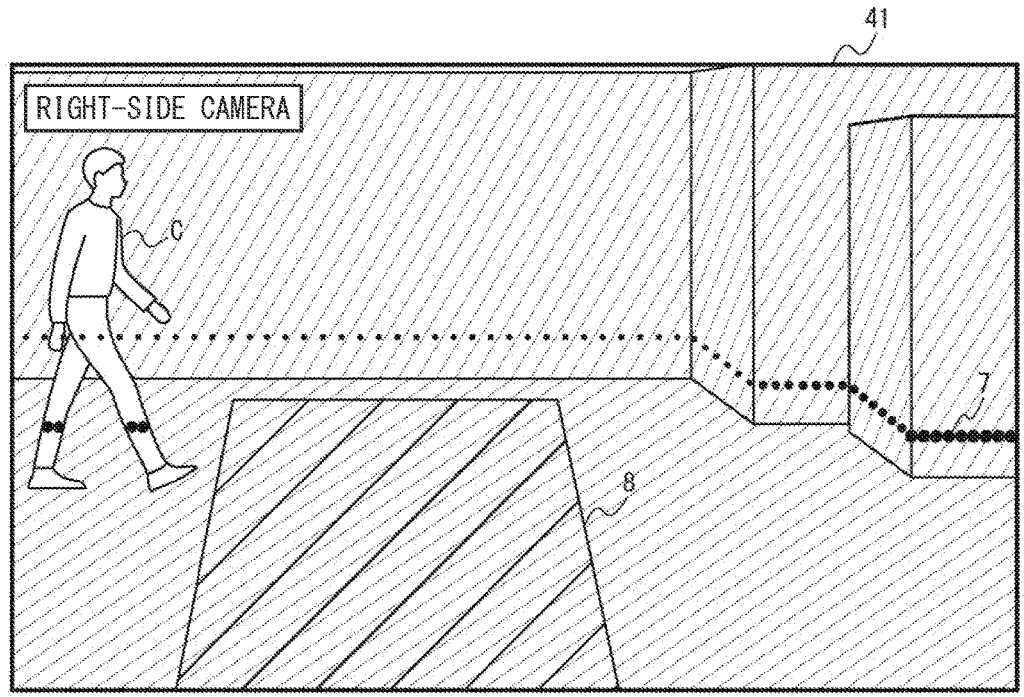
FIG. 6 is a view showing one example of the operation of the area monitoring sensor of FIGS. 3A and 3B and shows a detail check image that is displayed on the monitor screen.

FIG. 6 is a view showing one example of the operation of the area monitoring sensor 10 of FIGS. 3A and 3B, and shows a detail check image 41 that is displayed on the monitor screen 32. This drawing shows the detail check image 41 obtained from a camera image photographed by the camera 122.

The detail check image 41 is an image for display which is obtained by reducing the camera image photographed by the camera 121 or 122. In this detail check image 41, a distance measurement line 7 indicating a position of the target B on the scanning surface 4 is superimposed with a frame border 8 indicating the monitoring area 3.

The distance measurement line 7 is a figure indicating a boundary line of the scanning surface 4. This distance measurement line 7 is displayed by specifying the position of the target B in a three-dimensional space based on the distance to the target B and the scanning angle of the detection light, and specifying a two-dimensional position of the target B in the detail check image 41 based on the positional relation between the three-dimensional position and an angle of view of the camera 121 or 122.

For example, the distance measurement line 7 is made up of a large number of dots, and sizes and array pitches of the dots differ in accordance with distances to the target B. In this example, the farther the distance, the smaller the dot is made and the wider the array pitch is made. With such a configuration, it is possible to obtain a sense of perspective on the distance measurement line 7 on the scanning surface 4 when the detail check image 41 is displayed.

In addition, the dots constituting the distance measurement line 7 allow accurate display of a detection position. In this case, a configuration is made such that the scanning angle for detection does not change in each period, and hence the array pitches of the dots can be fixed. Further, a configuration may be made such that the distance measurement line 7 is displayed by a solid line in place of a large number of dots. Alternatively, the distance measurement line 7 may be displayed by a solid line and dots in combination.

The frame border 8 is a figure showing a position of the monitoring area 3 on the scanning surface 4. The frame border 8 is displayed by specifying the position of the monitoring area 3 in the three-dimensional space, and specifying a two-dimensional position of the monitoring area 3 in the detail check image 41 based on the positional relation between the three-dimensional position and the angle of view of the camera 121 or 122.

By displaying the frame border 8 as thus described on the detail check image 41 along with the distance measurement line 7, the positional relation between the monitoring area 3 and the distance measurement line 7 can be checked, thereby facilitating determination as to whether a desired area has been appropriately set as the monitoring area 3.

The area monitoring sensor 10 is installed in a building, such as a factory, with a large number of workers C. Hence a worker C is apt to get into the angle of view of the camera 121 or 122 and may appear as a subject in a camera image. In the detail check image 41 shown in the drawing, the worker C near the monitoring area 3 appears. When such a photographed image is displayed, the worker is at the risk of being personally identified.

Then in the monitoring system 1 according to the present embodiment, a privacy image with lower picture quality than that of the detail check image 41 is generated based on the camera image photographed by the camera 121 or 122, and the privacy image is selected as the display image, thus enabling reduction in personal identification of the worker.

<Privacy Image 42>

Figure 7:
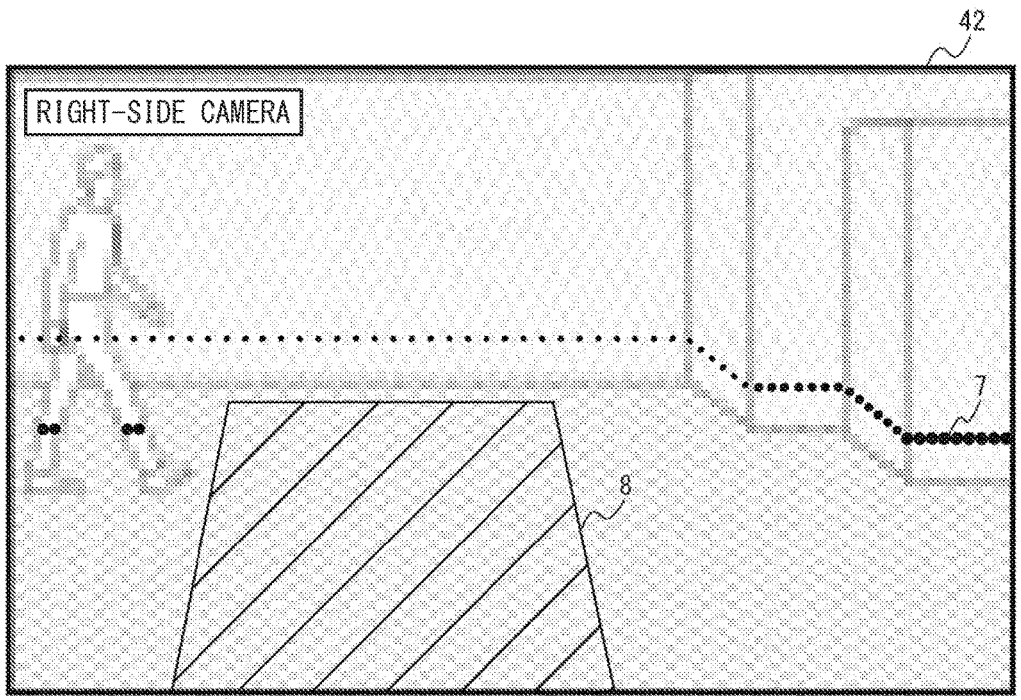
FIG. 7 is a view showing one example of the operation of the area monitoring sensor of FIGS. 3A and 3B, and shows a privacy image that is displayed on the monitor screen.

FIG. 7 is a view showing one example of the operation of the area monitoring sensor 10 of FIGS. 3A and 3B, and shows a privacy image 42 that is displayed on the monitor screen 32. This drawing shows the privacy image 42 obtained from the camera image photographed by the camera 122.

The privacy image 42 is an image for display in which the worker is difficult to personally identify, and is generated based on the camera image photographed by the camera 121 or 122. For example, the privacy image 42 is created by filtering on the camera image photographed by the camera 121 or 122, or filtering on the detail check image 41.

A variety of image filtering can be employed as the filtering for obtaining the privacy image 42. For example, the camera image is subjected to pixelization in which an image region is divided into a large number of processing blocks and a pixel value is replaced by a representative value with respect to each pixel in the processing block, to decrease a physical resolution for blurring the image.

It is possible to arbitrarily specify a shape and a size of the processing block as well as an arrangement aspect of the processing block. The representative value is a pixel value representing the processing block, and is set by a median, a mean or a mode of the pixel values concerning the pixels in the processing block. In this example, such pixelization has been performed over the image region.

Selecting the detail check image 41 as the display image can facilitate checking of an installation status as to whether or not the sensor body 120 has been appropriately installed with respect to the monitoring area 3. Meanwhile, selecting as the display image the privacy image 42 with lower picture quality than that of the detail check image 41 enables reduction in personal identification of the worker C even when the worker C appears in the camera image as a subject.

As the filtering for obtaining the privacy image 42, compression processing of decreasing the number of gradation of pixel data, such as binarization, may be used other than pixelization described above. Further, a configuration may be made such that the privacy image 42 is obtained by image processing of performing edge extraction on the camera image based on a brightness change and analyzing characteristic points to detect a face of the worker C and mask the face portion or the entire body of the worker. Moreover, an edge may be extracted from the camera image, to configure the privacy image 42 of a line drawing formed of a contour line indicating the edge.

Figure 8:
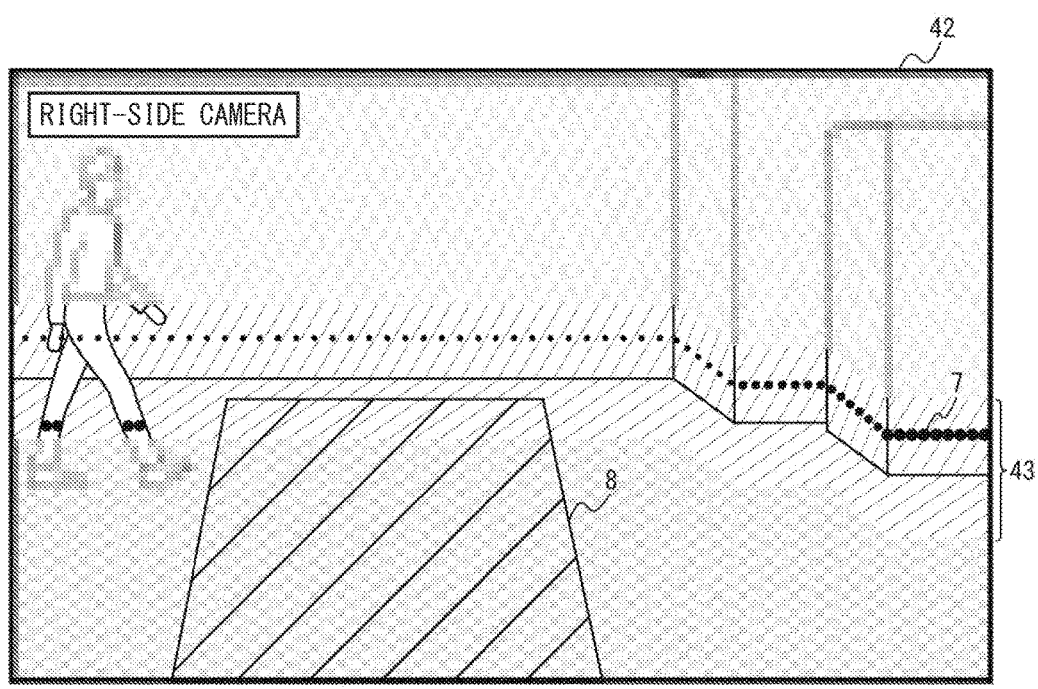
FIG. 8 is a view showing one example of the operation of the area monitoring sensor of FIGS. 3A and 3B, and shows another example of the privacy image.

FIG. 8 is a view showing one example of the operation of the area monitoring sensor 10 of FIGS. 3A and 3B, and shows another example of the privacy image 42. In this privacy image 42, a band-like region including the distance measurement line 7 that indicates the position of the target on the scanning surface 4 is specified as a focused monitoring region 43, and picture quality of the focused monitoring region 43 is matched with that of the detail check image 41. That is, in this privacy image 42, the picture quality in the focused monitoring region 43 is higher than that in a region other than the focused monitoring region 43.

For example, the focused monitoring region 43 is a roughly monospaced region extending along the distance measurement line 7, and is set based on a camera image photographed with the workers C being not present. In this example, the focused monitoring region 43 is formed of a region lying between a boundary line spaced upward from the distance measurement line 7 by a certain distance and a boundary line spaced downward from the distance measurement line 7 by a certain distance.

With such a configuration, it is possible to facilitate checking of the installation status while reducing personal identification of the worker due to display of the privacy image 42. It is to be noted that the focused monitoring region 43 may be a rectangular region with its vertical width covering a variation width of the distance measurement line 7. Further, the privacy image 42 may be configured by masking a region other than the focused monitoring region 43.

<Sensor Body 120>

Figure 9:
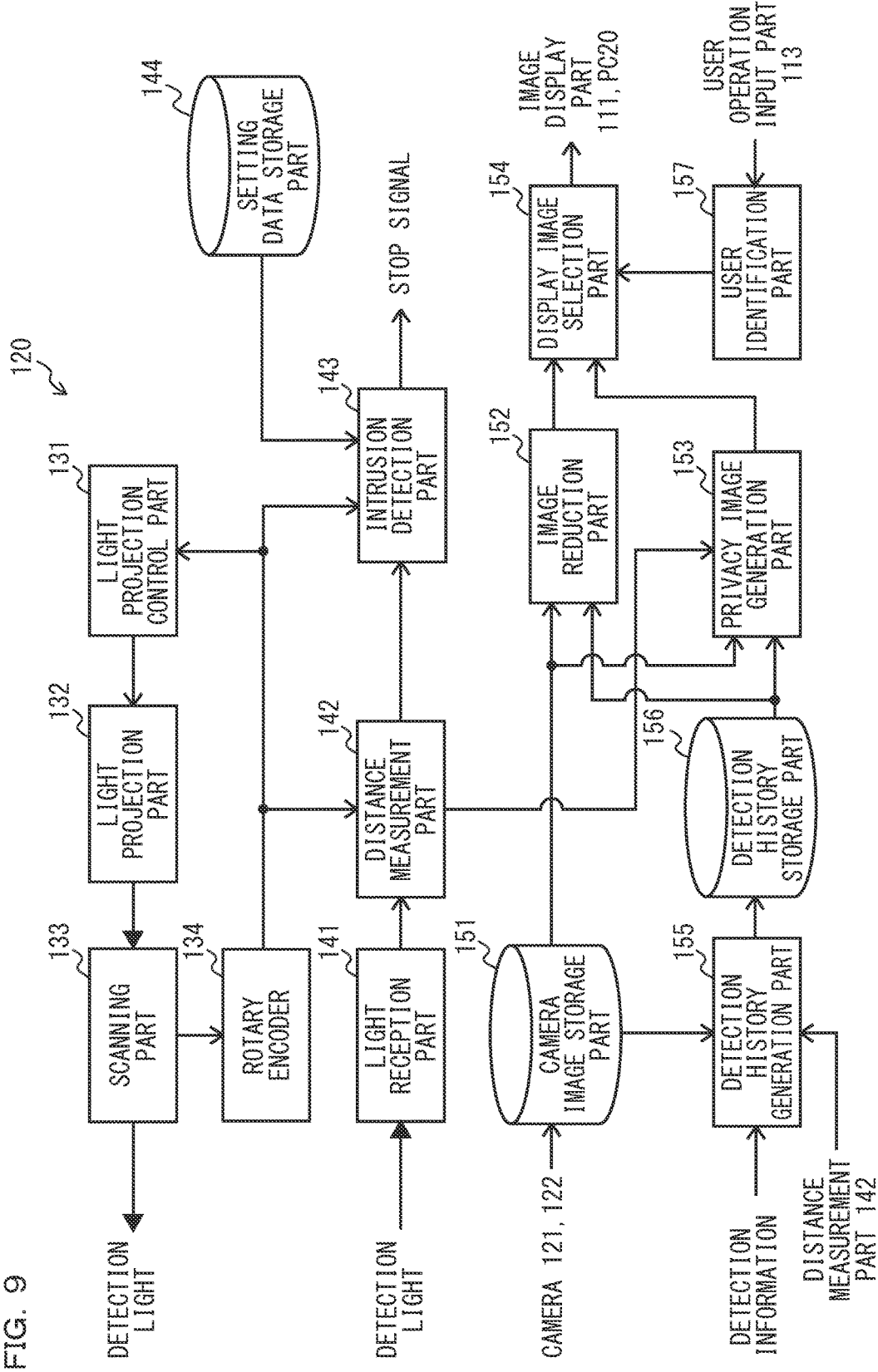
FIG. 9 is a block diagram showing one example of a functional configuration in a sensor body of FIGS. 3A and 3B.

FIG. 9 is a block diagram showing one example of a functional configuration in a sensor body 120 of FIGS. 3A and 3B. This sensor body 120 is configured of a light projection control part 131, a light projection part 132, a scanning part 133, a rotary encoder 134, a light reception part 141, a distance measurement part 142, an intrusion detection part 143, a setting data storage part 144, a camera image storage part 151, an image reduction part 152, a privacy image generation part 153, a display image selection part 154, a detection history generation part 155, a detection history storage part 156, and a user identification part 157.

The light projection part 132 is a light source device that generates detection light and emits the light toward the scanning part 133. The scanning part 133 is a scanner that performs a scan with the detection light in the circumferential direction about the rotational axis, along the scanning surface 4 intersecting with the rotational axis. The scanning part 133 is configured of a mirror (not shown) that reflects the detection light, incident from the light projection part 132, toward the target B.

The light reception part 141 receives the detection light reflected by the target B, to generate a detection signal. The rotary encoder 134 is a rotation detecting device that detects a rotational angle of the mirror of the scanning part 133, to generate a rotational pulse signal. The light projection control part 131 controls the light projection part 132 based on the rotational pulse signal of the rotary encoder 134, to adjust the light projection timing for the detection light. For example, the detection light is emitted every time the mirror rotates by 360°/1000.

The distance measurement part 142 is a distance calculation part that obtains a distance to the target B based on the detection signal from the light reception part 141. Specifically, the distance to the target B is calculated by comparing the detection signal with the rotational pulse signal of the rotary encoder 134 and specifying delay time from projection of the detection light to reception thereof. The delay time from the light projection to the light reception is measured every time the detection light is emitted.

The intrusion detection part 143 detects an intruding object in the monitoring area 3 based on the distance to the target B and a scanning angle of the detection light, to generate a stop signal for stopping an operation of the external device. The scanning angle of the detection light is specified based on the rotational pulse signal of the rotary encoder 134. Further, it is determined whether or not the target B is present in the monitoring area 3 by specifying a two-dimensional position of the target B from the distance to the target B and the scanning angle of the detection light. The stop signal is directly outputted from the sensor body 120, or outputted through the interface part 110.

The setting data storage part 144 stores, as setting data, positional information indicating the two-dimensional position of the monitoring area 3. The cameras 121 and 122 each photograph the monitoring area 3, to generate a camera image made up of a still image or a moving image.

The camera image storage part 151 is a storage device that sequentially stores the camera images generated by the cameras 121 and 122, and regularly deletes a camera image with an old photographing time. For example, the camera image storage part 151 is made up of a ring buffer, and when its storage region is filled with camera images, a newly photographed camera image overwrites an old camera image, sequentially from the camera image with the oldest photographing time.

The detection history generation part 155 reads from the camera image storage part 151 a camera image photographed at the time of detection of the intruding object in the monitoring area 3, to generate a detection history based on the camera image, the detection information obtained by the intrusion detection part 143, and the distance information from the distance measurement part 142. The detection history storage part 156 stores, as the detection history, a camera image formed of a moving image with a certain length of time including the time of detection of the intruding object in the monitoring area 3, and positional information indicating the position of the intruding object.

The image reduction part 152 is a detail check image generation part that reduces the camera image read from the camera image storage part 151 or the detection history storage part 156, to generate the detail check image 41. The privacy image generation part 153 generates the privacy image 42 with lower picture quality than that of the detail check image 41 based on the camera image read from the camera image storage part 151 or the detection history storage part 156.

The display image selection part 154 selects either the detail check image 41 or the privacy image 42 as the display image. The display image selected by the display image selection part 154 is displayed in the image display part 111 or the PC 20.

In the detail check image 41 and the privacy image 42, the distance measurement line 7 and the frame border 8 are displayed, the distance measurement line 7 indicating the position of the target B on the scanning surface 4, the frame border 8 indicating the monitoring area 3. Further, a display magnification and a scale of each of the detail check image 41 and the privacy image 42 can be changed by reducing the camera image to adjust a reduction ratio at the time of creating a display image.

In the detail check image 41 and the privacy image 42 obtained from the camera image stored as the detection history, the position of the intruding object is displayed by a figure or a symbol. For example, the position of the intruding object is displayed by the distance measurement line 7. With such a configuration, it is possible to facilitate checking of the intruding object having intruded into the monitoring area 3 by means of the display image. It is thereby possible to find in detail what has caused generation of the stop signal. Further, since the privacy image 42 as thus described has lower picture quality than that of the detail check image 41, it is possible to reduce personal identification of the worker due to display of the privacy image 42.

The privacy image generation part 153 generates two or more privacy images 42 each having different picture quality based on a common camera image. The display image selection part 154 selects either of the privacy images 42 as the display image based on a user operation. With such a configuration, it is possible to switch the picture quality of the privacy image 42 as necessary.

The user operation input part 113 accepts identification information specified by the user. For example, a password consisting of a plurality of characters is inputted as the identification information. When such identification information is accepted by the user operation input part 113, the user identification part 157 collates the identification information with registration information previously specified by an administrator to perform the user identification.

The display image selection part 154 selects either the detail check image 41 or the privacy image 42 as the display image based on a user operation. On the other hand, when failing in the user identification, the display image selection part 154 selects the privacy image 42 as the display image. That is, only a user who has succeeded in the user identification can view both the detail check image 41 and the privacy image 42, and a user who has failed in the user identification can view only the privacy image 42.

With such a configuration, viewing of the detail check image 41 is limited to the user who has succeeded in the user identification, thus allowing reduction in seeing of a behavior of the worker C by many users due to display of the detail check image 41.

According to the present embodiment, it is possible to facilitate checking of the installation status of the sensor body 120, and also possible to reduce personal identification of the worker even in the case of displaying a camera image with the worker C appearing therein. Further, the band-like focused monitoring region 43 including the boundary line on the scanning surface 4 is formed in the privacy image 42, and the picture quality of the focused monitoring region 43 is matched with that of the detail check image 41. Hence it is possible to facilitate checking of the installation status while reducing personal identification of the worker.

It should be noted that in the present embodiment, the example of the case has been described where a camera image formed of a moving image with a certain length of time including the time of detection of the intruding object is stored as the detection history, but the present invention does not limit the camera image stored as the detection history to the described camera image. For example, a configuration may be formed such that a camera image is stored as the detection history, the camera image being made up of one still image or two or more still images including a camera image photographed immediately after detection of the intruding object or a camera image photographed immediately before detection of the intruding object.

Further, in the present embodiment, the example of the case has been described where the sensor body 120 is provided with the intrusion detection part 143, the setting data storage part 144, the image reduction part 152, the privacy image generation part 153, the display image selection part 154 and the user identification part 157, but the present invention does not limit the configuration of the sensor body 120 and the interface part 110 to the described configuration. For example, the interface part 110 or the PC 20 may be configured to have the function of the intrusion detection part 143, the setting data storage part 144, the image reduction part 152, the privacy image generation part 153, the display image selection part 154 or the user identification part 157.

Moreover, in the present embodiment, the example of the case has been described where the area monitoring sensor 10 is the optical scanning-type safety sensor, but the present invention does not limit the configuration of the area monitoring sensor 10 to the described configuration. For example, the present invention is also applicable to an area monitoring sensor which includes a light projector linearly arranged with a plurality of light emitting elements and a light receptor linearly arranged with a plurality of light receiving elements, and in which the light projector and the light receptor are arranged facing each other, to monitor a region lying between the light projector and the light receptor.

What is claimed is:

1. A monitoring system comprising:
    an intrusion detecting section configured to detect an intruding object in a monitoring area, to generate a stop signal for stopping an operation of an external device;
    a camera configured to photograph the monitoring area;
    a detail check image generating section configured to generate a detail check image for display based on a camera image photographed by the camera;

a privacy image generating section configured to generate a privacy image with lower picture quality than picture quality of the detail check image based on the camera image;
a display image selecting section configured to select either the detail check image or the privacy image as a display image;
an image displaying section configured to display the display image selected by the display image selecting section,
a light projector configured to generate detection light;
a light receiver configured to receive the detection light reflected by a target, to generate a detection signal;
a scanning section configured to perform a scan with the detection light in a circumferential direction about a rotational axis, along a scanning surface intersecting with the rotational axis; and
a distance measuring section configured to obtain a distance to the target based on the detection signal, wherein
the intrusion detecting section detects an intruding object in the monitoring area based on the distance to the target and a scanning angle of the detection light,
the camera is arranged above the scanning surface in terms of the rotational axial direction, and
the privacy image generating section specifies a boundary line made up of a position of the target on the scanning surface based on the distance to the target and the scanning angle of the detection light, and takes a band-like region including the boundary line in the privacy image as a focused monitoring region, to match picture quality of the focused monitoring region with picture quality of the detail check image.

2. A monitoring system comprising:
an intrusion detecting section configured to detect an intruding object in a monitoring area, to generate a stop signal for stopping an operation of an external device;
a camera configured to photograph the monitoring area;
a detail check image generating section configured to generate a detail check image for display based on a camera image photographed by the camera;
a privacy image generating section configured to generate a privacy image with lower picture quality than picture quality of the detail check image based on the camera image;
a display image selecting section configured to select either the detail check image or the privacy image as a display image;
an image displaying section configured to display the display image selected by the display image selecting section, and
a detection history storing section configured to store as a detection history the camera image photographed at the time of detection of the intruding object in the monitoring area, along with positional information indicating a position of the intruding object,
wherein
the privacy image generating section generates the privacy image based on the camera image stored as the detection history, and
the image displaying section displays the position of the intruding object on the privacy image based on the positional information stored as the detection history.

3. The monitoring system according to claim 2, wherein the image displaying section is provided separately from a sensor body that includes the intrusion detecting section, the camera and the detection history storing section, and is made up of a display device used in common among two or more of the sensor bodies.

4. The monitoring system according to claim 2, wherein the privacy image generating section generates two or more of the privacy images each having different picture quality based on a common camera image, and the display image selecting section selects any one of the privacy images as the display image based on a user operation.

5. The monitoring system according to claim 2, further comprising: a user operation inputting section configured to accept identification information specified by the user; and
a user identifying section configured to collate the identification information with registration information previously specified by an administrator,
wherein, when succeeding in the user identification, the display image selecting section selects either the detail check image or the privacy image as the display image based on a user operation, and when failing in the user identification, the display image selecting section selects the privacy image as the display image.

6. The monitoring system according to claim 1, further comprising
a detection history storing section configured to store as a detection history the camera image photographed at the time of detection of the intruding object in the monitoring area, along with positional information indicating a position of the intruding object,
wherein
the privacy image generating section generates the privacy image based on the camera image stored as the detection history, and
the image displaying section displays the position of the intruding object on the privacy image based on the positional information stored as the detection history.

7. The monitoring system according to claim 1, wherein the privacy image generating section generates two or more of the privacy images each having different picture quality based on a common camera image, and
the display image selecting section selects any one of the privacy images as the display image based on a user operation.

8. The monitoring system according to claim 1, further comprising:
a user operation inputting section configured to accept identification information specified by the user; and
a user identifying section configured to collate the identification information with registration information previously specified by an administrator, wherein,
when succeeding in the user identification, the display image selecting section selects either the detail check image or the privacy image as the display image based on a user operation, and when failing in the user identification, the display image selecting section selects the privacy image as the display image.

9. A monitoring system comprising:
an intrusion detecting section configured to detect an intruding object in a monitoring area, to generate a stop signal for stopping an operation of an external device;
a camera configured to photograph the monitoring area;
a detail check image generating section configured to generate a detail check image for display based on a camera image photographed by the camera;

a privacy image generating section configured to generate a privacy image with lower picture quality than picture quality of the detail check image based on the camera image;

an image displaying section configured to display the privacy image;

a scanning section configured to perform a scan with a detection light for detecting an intruding object in a circumferential direction about a rotational axis, along a scanning surface intersecting with the rotational axis; and a distance measuring section configured to obtain a distance to the target based on the detection signal, wherein the privacy image generating section specifies a boundary line made up of a position of the target on the scanning surface based on the distance to the target and the scanning angle of the detection light, and takes a band-like region including the boundary line in the privacy image as a focused monitoring region, to match picture quality of the focused monitoring region with picture quality of the detail check image.

10. The monitoring system according to claim 9, further comprising a detection history storing section configured to store as a detection history the camera image photographed at the time of detection of the intruding object in the monitoring area, along with positional information indicating a position of the intruding object, wherein the privacy image generating section generates the privacy image based on the camera image stored as the detection history, and the image displaying section displays the position of the intruding object on the privacy image based on the positional information stored as the detection history.

11. The monitoring system according to claim 9, wherein the privacy image generating section generates two or more of the privacy images each having different picture quality based on a common camera image, and the display image selecting section selects any one of the privacy images as the display image based on a user operation.

12. The monitoring system according to claim 10, wherein the privacy image generating section generates two or more of the privacy images each having different picture quality based on a common camera image, and the display image selecting section selects any one of the privacy images as the display image based on a user operation.

13. The monitoring system according to claim 9, further comprising:

a user operation inputting section configured to accept identification information specified by the user; and a user identifying section configured to collate the identification information with registration information previously specified by an administrator, wherein, when succeeding in the user identification, the display image selecting section selects either the detail check image or the privacy image as the display image based on a user operation, and when failing in the user identification, the display image selecting section selects the privacy image as the display image.

14. The monitoring system according to claim 1, wherein the privacy image with lower picture quality is created by filtering on the detail check image, masking at least a part of the detail check image or image processing on the detail check image.

15. The monitoring system according to claim 2, wherein the privacy image with lower picture quality is created by filtering on the detail check image, masking at least a part of the detail check image or image processing on the detail check image.

16. The monitoring system according to claim 9, wherein the privacy image with lower picture quality is created by filtering on the detail check image, masking at least a portion of the detail check image or image processing on the detail check image.

17. The monitoring system according to claim 1, wherein the privacy image with lower picture quality is an image which is masked on a portion of or an entire of a worker in the detail check image.

18. The monitoring system according to claim 2, wherein the privacy image with lower picture quality is an image which is masked on a portion of or an entire of a worker in the detail check image.

19. The monitoring system according to claim 9, wherein the privacy image with lower picture quality is an image which is masked on a portion of or an entire of a worker in the detail check image.

* * * * *